United States Patent [19]

Katsuhisa et al.

[11] 4,413,103

[45] Nov. 1, 1983

[54] HALOGEN-CONTAINING POLYCARBONATE RESIN AND PROCESS FOR PRODUCING SAME

[75] Inventors: Kohyama Katsuhisa; Nakamura Katsuhiko; Matsuno Akira, all of Kitakyushu, Japan

[73] Assignee: Mitsubishi Chemical Industries., Ltd., Tokyo, Japan

[21] Appl. No.: 352,187

[22] Filed: Feb. 25, 1982

[30] Foreign Application Priority Data

Mar. 20, 1981 [JP] Japan ................... 56-41079

[51] Int. Cl.$^3$ ............... C08L 69/00; C08G 63/62
[52] U.S. Cl. ................... 525/469; 528/202; 528/204; 525/470; 260/DIG. 24
[58] Field of Search .......... 525/469, 462, 470; 528/202, 204, 499; 524/537

[56] References Cited

U.S. PATENT DOCUMENTS

| | | | |
|---|---|---|---|
| 3,038,874 | 6/1962 | Laakso et al. | 260/42 |
| 3,062,781 | 11/1962 | Bottenbruch et al. | 260/47 |
| 3,119,787 | 1/1964 | Laakso et al. | 260/47 |
| 3,334,154 | 8/1967 | Kim | 360/860 |
| 3,890,266 | 6/1975 | Serini et al. | 260/37 |
| 4,308,373 | 12/1981 | Mori et al. | 528/202 |
| 4,323,663 | 4/1982 | Mori et al. | 525/470 |

FOREIGN PATENT DOCUMENTS 38-7147  5/1963  Japan .

*Primary Examiner*—Theodore E. Pertilla
*Attorney, Agent, or Firm*—Kenway & Jenney

[57] ABSTRACT

A halogen-containing polycarbonate resin is formed by copolymerizing the following oligomers (a) and (b) in the presence of caustic alkali an organic solvent and water and in the substantial absence of bisphenol A:

(a) 10 to 85 parts by weight of a polycarbonate oligomer with terminal groups consisting of chloroformate groups or chloroformate groups plus hydroxyl groups in a molar amount less than the chloroformate groups, having a number average molecular weight of 500 to 10,000 and containing no aromatic halogen or less than 4% by weight of aromatic halogen, and (b) 90 to 15 parts by weight of an aromatic halogen-containing polycarbonate oligomer with terminal groups consisting of chloroformate groups or chloroformate groups plus hydroxyl groups in a molar amount less than the chloroformate groups, having a number average molecular weight of 1,000 to 10,000 and containing 6 to 30% by weight of aromatic halogen.

13 Claims, No Drawings

HALOGEN-CONTAINING POLYCARBONATE RESIN AND PROCESS FOR PRODUCING SAME

BACKGROUND OF THE INVENTION

1. Field of the Invention

The present invention relates to halogen-containing polycarbonate resins which are non-inflammable or inflammable only with difficulty and to an industrially advantageous process for preparing the same using phosgene.

2. The Prior Art

Various methods are known for the production of a halogen-containing polycarbonate resin by a phosgene process, for example:

(1) U.S. Pat. No. 3,062,781 discloses a method in which a mixture of a halogenated bisphenol A and bisphenol A is reacted with phosgene to directly yield the resin;

(2) Japanese Patent publication No. 7147, 1963 discloses a method in which bisphenol A is reacted with phosgene to produce a polychloroformate (i.e. a polycarbonate oligomer), which is then reacted with a halogenated besphenol A and bisphenol A to obtain a resin of high molecular weight; and (3) a method wherein (1) polycarbonate prepared from bisphenol A and (2) a polycarbonate prepared from tetrachlorobisphenol A are catalytically polymerized.

In the production of a polycarbonate resin from bisphenol A by means of the phosgene process, the resin is usually purified by washing the organic solvent solution of the resin, obtained by the polymerization reaction, with an aqueous washing agent such as water or an acid solution. After the washing for purification ("refining"), the organic solvent solution of the resin is concentrated to cause the resin to precipitate from solution in the form of a powder. If an attempt is made to produce a polycarbonate resin containing a relatively large amount of halogen, e.g. the 4% by weight required to render the resin essentially flameproof, using the conventional methods, it is extremely difficult to wash and concentrate the resin/solvent solution obtained by the polymerization and to pulverize the resin using the conventional methods, as compared with the case wherein only bisphenol A is used as the starting material. Moreover, polycarbonate resins of high halogen content obtained by the conventional methods have inferior melt fluidity as compared with a polycarbonate resin prepared from bisphenol A alone.

For example, a methylene chloride solution containing 10% by weight of a polycarbonate resin with a bromine content of 4% by weight, prepared by the above-mentioned method (2), i.e. by the reaction of a polycarbonate oligomer with tetrabromobisphenol A and bisphenol A, forms an emulsion when subjected to washing on an industrial scale, thus hindering the separation of the organic solvent phase containing the resin from the aqueous phase, or, if the separation is possible, numerous dirt layers form which adversely affect the washing efficiency and which make adequate removal of the impurities difficult. Accordingly, the resin product tends to have inferior color and low thermal stability. Further, the resin product is recovered as a viscous gel which is very difficult to pulverize and which inhibits its production on an industrial scale.

Accordingly, it is an object of the present invention to provide a flameproof polycarbonate resin having good color, high thermal stability and good melt fluidity.

It is a further object to provide such a polycarbonate resin having a high halogen content.

Yet another object of the invention is to provide an industrially advantageous process for production of such a resin wherein washing, concentrating and pulverizing steps are facilitated.

Other objects and features of the present invention will become apparent from the detailed description to follow.

SUMMARY OF THE INVENTION

As a result of extensive research directed to overcoming the above-mentioned problems in the production of flameproof polycarbonate resins the present inventors have found that when two kinds of polycarbonate oligomer are co-polymerized in certain proportions, the resin is obtained in an organic solvent solution which is readily washed, purified and concentrated. Moreover, the resin product is readily pulverizable and has a good melt fluidity, even though of a high halogen content.

The present invention provides for production of a halogen-containing polycarbonate resin by a process suitable for operation on an industrial scale. More specifically, the process of the invention involves:

(1) co-polymerizing the following oligomers (a) and (b) in the presence of caustic alkali an organic solvent, water and in the substantial absence of residual bisphenol A and in the absence of added bisphenol A to form a solution of the halogen-containing polycarbonate in the organic solvent;

(a) 10 to 85 parts by weight of a polycarbonate oligomer with terminal groups consisting of chloroformate groups or chloroformate groups plus hydroxyl groups less in a molar amount than chloroformate groups, having a number average molecular weight of 500 to 10,000 and containing no aromatic halogen or less than 4% by weight of aromatic halogen, and (b) 90 to 15 parts by weight of an aromatic halogen-containing polycarbonate oligomer with terminal groups consisting of chloroformate groups or chloroformate groups plus hydroxyl groups in a molar amount less than the chloroformate groups, having a number average molecular weight of 1,000 to 10,000 and containing 6 to 30% by weight of aromatic halogen;

(2) washing the organic solvent solution containing the halogen-containing polycarbonate resin with an aqueous washing agent; and (3) recovering the polycarbonate resin from the organic solvent.

DESCRIPTION OF THE PREFERRED EMBODIMENTS

The polycarbonate oligomer with terminal groups consisting of chloroformate groups or chloroformate groups plus hydroxyl groups in a molar amount less than the chloroformate groups one of the starting materials in the present invention, hereinafter referred to as "oligomer (a)", has a number average molecular weight of 500 to 10,000 and contains no aromatic halogen or less than 4% by weight of aromatic halogen. This "oligomer (a)" may be prepared, for example, by reacting bisphenol A or a mixture of bisphenol A and a halogenated bisphenol A with phosgene by a conventional interfacial polymerization method or solution polymerization method, or by reacting a low molecular weight polycarbonate oligomer prepared from bisphenol A and phosgene, with a halogenated bisphenol A.

Examples of suitable halogenated bisphenol A reactants include 2,2-bis(4-hydroxy-3,5-dibromophenyl) propane (tetrabromo bisphenol A), 2,2-bis(4-hydroxy-3,5-dichlorophenyl) propane, 2,2-bis(4-hydroxy-3-bromophenyl) propane, 2,2-bis(4-hydroxy-3-chlorophenyl) propane, 2,2-bis(4-hydroxy-2,3,5,6-tetrabromophenyl) propane, and 2,2-bis(4-hydroxy-2,3,5,6-tetrachlorophenyl) propane.

A portion of the bisphenol A may be substituted by a dihydroxy diaryl compound, for example, a bis(hydroxyaryl) alkane such as bis(4-hydroxy-phenyl) methane or 1,1-bis(4-hydroxyphenyl) ethane, a bis(hydroxyaryl) cycloalkane such as 1,1-bis(4-hydroxyphenyl) cyclohexane, a dihydroxy diaryl ether such as 4,4'-dihydroxy diphenyl ether, a dihydroxy diaryl sulfide such as 4,4'-dihydroxy diphenyl sulfide, or a dihydroxy diaryl sulfone such as 4,4'-dihydroxy diphenyl sulfone.

The number average molecular weight of the oligomer (a) is 500 to 10,000, preferably 700 to 5,000. Where the number average molecular weight is too small or too large, the polycarbonate thereby obtained forms an organic solvent solution which is difficult to purify with an aqueous wash or which resists a pulverization.

The terminal groups of the oligomer (a) consist of chloroformate groups or chloroformate groups plus hydroxyl groups in a molar amount less than the chloroformate groups. There is no particular restriction on the molar amount of the hydroxyl groups except that it does not exceed the molar amount of the chloroformate groups. The terminal groups may consist essentially of chloroformate groups and substantially no hydroxyl groups. The molar amount of the hydroxyl groups is usually at most 95%, preferably 20 to 90% of the molar amount of the chloroformate groups. If the molar amount of the hydroxyl groups exceeds the molar amount of the chloroformate groups, the copolymerization reaction of the present invention employing only a caustic alkali tends not to proceed smoothly. Thus, such a condition is undesirable.

It is usual that in the production of oligomers using phosgene in an amount equivalent to or slightly in excess, in molar ratio, of bisphenol A or a total amount of bisphenol A and a halogenated bisphenol A in accordance with the above described process for the production of oligomers, the molar amount of the hydroxyl groups as the terminal groups of the oligomers is smaller than the molar amount of the chloroformate groups. Therefore, it is industrially advantageous to employ this as it is.

The aromatic halogen content of the oligomer (a) must be less than 4% by weight. The oligomer (a) may contain a small amount of aromatic halogen. However, if the aromatic halogen content is too great no improvement is realized in washability or in concentration and pulverization of the organic solvent solution/suspension of the polycarbonate resin thereby obtained.

The halogen-containing polycarbonate oligomer with terminal groups consisting of chloroformate groups or chloroformate groups plus hydroxyl groups less in a molar amount than the chloroformate groups, having a number average molecular weight of 1,000 to 10,000 and containing 6 to 30% by weight of aromatic halogen (hereinafter referred to as "oligomer (b)") can be produced by reacting a mixture of the halogenated bisphenol A and bisphenol A with phosgene by conventional interfacial polymerization or solution polymerization, or by reacting a polycarbonate oligomer prepared from bisphenol A and phosgene, e.g. oligomer (a), with the halogenated bisphenol A. In the production of the oligomer (b), a part of the bisphenol A may be substituted with a dihydroxy diaryl compound as in the method for the production of oligomer (a).

The number average molecular weight of the oligomer (b) is 1,000 to 10,000, preferably 1,500 to 7,000. If the number average molecular weight is either too small or too large, the washing and pulverization of the organic solvent solution/suspension of the polycarbonate resin becomes difficult.

As in the case of the above mentioned oligomer (a), there is no particular restriction on the molar amount of the hydroxyl groups in the case of the terminal groups of the oligomer (b) except that it does not exceed the molar amount of the chloroformate groups. Usually, the molar amount of the hydroxyl groups at the terminals of the oligomers prepared by the above mentioned process for the production of the oligomers, is smaller than the molar amount of the chloroformate groups. Therefore, it is advantageous to use this as it is.

The aromatic halogen content of the oligomer (b) is 6 to 30% by weight, preferably 8 to 20% by weight. If the aromatic halogen content is too small, it is impossible to obtain a high halogen content in the polycarbonate resin thereby obtained and accordingly it is impossible to obtain a polycarbonate resin which is sufficiently flameproof. On the other hand, if the aromatic halogen content is too great, washing and pulverization of the organic solvent solution/suspension of the polycarbonate resin thereby obtained, becomes difficult.

The co-polymerization reaction of the present invention can be carried out by subjecting the starting materials i.e. oligomer (a) and oligomer (b) to interfacial polymerization in the substantial absence of bisphenol A, using caustic alkali aqueous solution, a terminator and an organic solvent in accordance with conventional techniques.

In the copolymerization reaction according to the present invention, the presence of bisphenol A does not adversely affect the copolymerization reaction itself. However, it brings about disadvantages such that after the completion of the copolymerization reaction, nonreacted bisphenol A remains, and it will be incorporated in the organic solvent solution of the formed halogen-containing polycarbonate resin, thus leading to degradation of the washability of the organic solvent solution, and the amount of the residual bisphenol A in the obtained halogen-containing polycarbonate resin will be increased. Thus, in the copolymerization reaction of the present invention, bisphenol A should not be present as far as possible.

Oligomers (a) and (b) may be used as individually isolated products. However, in industrial applications of the copolymerization reaction of the present invention it may be advantageous to use them in the form of a mixture obtained from the production of the oligomers, without isolation, or after removing water from such a mixture as the case requires.

The ratio of oligomers (a) and (b) is determined on the basis of the aromatic halogen contents of oligomers (a) and (b) and the desired halogen content for the polycarbonate resin product, and is within a range, based on a total of 100 parts by weight, wherein oligomer (a) is 10 to 85 parts by weight, preferably 20 to 75 parts by weight and oligomer (b) is 90 to 15 parts by weight, preferably 80 to 25 parts by weight.

As the terminator, there may be mentioned phenols such as p-tertiary butyl phenol and phenol. As the catalyst, there may be mentioned alkylamines such as triethylamine. As the organic solvent, there may be mentioned halogenated hydrocarbons such as methylene chloride, chloroform, trichloroethane, trichloroethylene and chlorobenzene. These are well known as materials for the production of polycarbonate resins.

As the caustic alkali, there may be mentioned caustic soda and caustic potash. However, it is industrially advantageous to use caustic soda. The amount of the caustic alkali to be used is at least such that the alkaline condition is maintained during the copolymerization reaction. The caustic alkali may be added only once at the beginning of the copolymerization reaction or in several times during the copolymerization reaction.

Even when the caustic alkali is present in an excess amount, there is no particular disadvantage other than a question of economy. Therefore, it is advisable that at the beginning of the copolymerization reaction, an excess amount of the caustic alkali is added so that the caustic alkali concentration in the aqueous phase upon termination of the copolymerization reaction becomes at least 0.05 N, preferably from 0.1 to 1 N.

The temperature for the co-polymerization may be similar to that used in known methods for the production of polycarbonate resins, namely, at room temperature. The reaction time is 0.5 to 5 hours, preferably 1 to 3 hours.

According to the present invention, bisphenol A is substantially not present during the copolymerization reaction, and accordingly, the amount of non-reacted bisphenol A in the reaction mixture is extremely small. Accordingly, even if the halogen content of the resin is great, the organic solvent solution of the halogen-containing polycarbonate resin obtained from the copolymerization reaction can readily be washed, and the removal of the catalyst can adequately be effected. Thus, it is possible to obtain an organic solvent solution of the resin containing an extremely small amount of impurities, and the solution thus obtained can readily be concentrated to form a powder. Thus, it is possible to produce a highly pure halogen-containing polycarbonate resin industrially advantageously.

Besides, the resin thus obtained has good melt flowability despite its high halogen content. Thus, the present process is extremely advantageous as compared with the conventional processes, for the production of a halogen-containing polycarbonate having a halogen content of 4 to 25% by weight, particularly 6 to 25% by weight, and a reduced viscosity of 0.3 to 1.0.

In the copolymerization reaction of the present invention, the reaction in which the chloroformate groups and the hydroxyl groups at the terminals of the oligomers (a) and (b) yield dehydrochloric acid in bonding, is believed to proceed in parallel with the reaction in which the excess chloroformate groups are hydrolyzed to form hydroxyl groups which in turn immediately react with the remaining chloroformate groups to yield dehydrochloric acid for bonding. The reaction velocity in the hydrolysis reaction of the chloroformate groups is smaller than that in the reaction of the chloroformate groups with the hydroxyl groups for bonding, and accordingly, it is believed that the hydrolysis reaction is less influenced by the amount of the caustic alkali, whereby the copolymerization reaction proceeds smoothly.

Although the mechanism or mechanisms by which the method of the present invention provides the aforementioned advantages, i.e, good washability, ease of recovery and pulverization of the resin, and the good melt fluidity of the resin, are not entirely clear at the present time, it is believed that by the copolymerization of the present invention, units of oligomers (a) and (b) each having a certain length are arranged with a certain regularity to form a block co-polymer.

Now, the invention will be described in further detail by the working examples which follow. It should be understood, however, that the present invention is not limited to these specific examples. In the following examples, "parts" and "%" mean "parts by weight" and "% by weight", respectively. "Number average molecular weight" as used herein is calculated by the following formula:

$$\frac{10^6}{\left(\begin{array}{c}\text{terminal chloroformate groups} + \\ \text{terminal hydroxyl groups } \mu\text{mol/g oligomer}\end{array}\right) \times \frac{1}{2}}$$

and "reduced viscosity ($\eta sp/C$)" represents a value obtained by measuring a 0.6 g/dl methylene chloride solution at 20° C. with use of Ubbelohde's viscometer; the numbers for terminal chloroformate groups reported here were calculated from the analysis of chlorine produced by the decomposition of the oligomers; the numbers for terminal hydroxyl groups represent values obtained from the colorimetric analysis of the color development of titanium tetrachloride; the numbers for bromine content represent values measured by fluorescent X-ray; the values for water content were determined by Karl Fisher's method; and the values for remainder of bisphenol A were measured by an ultraviolet absorption analysis.

EXAMPLE 1

An aqueous alkali solution containing 13.5% bisphenol A was prepared by dissolving bisphenol A in a 5.5% sodium hydroxide aqueous solution (hereinafter referred to as "BPA solution"). This BPA solution, with methylene chloride added, was reacted with phosgene to obtain a methylene chloride solution containing 23.0% of oligomer (a) having a number average molecular weight of 830 and containing terminal chloroformate groups 2015 $\mu$mol/g oligomer and terminal hydroxy groups 400 $\mu$mol/g oligomer.

An aqueous alkali solution containing 27% tetrabromobisphenol A (hereinafter referred to as "TBBPA solution") was prepared by dissolving tetrabromobisphenol A in a 5.5% sodium hydroxide aqueous solution. 130 parts of this TBBPA solution were added to 440 parts of the above methylene chloride solution of oligomer (a). The ensuing reaction resulted in formation of a methylene chloride solution containing 28.4% of oligomer (b) having a number average molecular weight of 1570, a bromine content of 15.3%, terminal chloroformate groups 890 $\mu$mol/g oligomer, and terminal hydroxyl groups 350 $\mu$mol/g oligomer.

260 parts of the above-mentioned methylene chloride solution of oligomer (a), 250 parts of the methylene chloride solution of the oligomer (b), 58 parts of 25% sodium hydroxide aqueous solution, 52 parts of water, 250 parts of methylene chloride, 2.9 parts of p-tertiary butyl phenol and 0.06 part of triethylamine, were fed into a tank equipped with an agitator and the copolymerization reaction was conducted for 1.5 hours with agitation.

After the completion of the co-polymerization reaction, the concentration of sodium hydroxide in aqueous solution was 0.45 N.

After the completion of the co-polymerization reaction methylene chloride was added to the reaction mixture to dilute it so that the polycarbonate resin concentration relative to the methylene chloride was reduced to 10%. After mixing and agitating the mixture in the agitation tank, the mixture was left to stand still for phase separation and then the methylene chloride phase was separated and washed 5 times under the conditions indicated in the following Table 1. Upon completion of each step, the water content of the methylene chloride solution was measured.

TABLE 1

| Steps | Washing agent | Agitation & Mixing Water phase ratio | Agitation & Mixing Time (min) | Standing Time for Separation Time (min) | Standing Time for Separation State of Separation | Water Content of Methylene Chloride Solution (%) |
|---|---|---|---|---|---|---|
| 1 | Water | 0.3:1.0 | 10 | 10 | good | 0.82 |
| 2 | Water | 0.3:1.0 | 20 | 10 | good | 0.44 |
| 3 | 0.1 N HCl | 0.3:1.0 | 20 | 10 | good | 0.26 |
| 4 | Water | 0.3:1.0 | 20 | 10 | good | 0.26 |
| 5 | Water | 0.3:1.0 | 20 | 10 | good | 0.24 |

In the above Table, the "water phase ratio" is the ratio of the weight of the water phase to the weight of the methylene chloride phase.

The methylene chloride solution of the halogen-containing polycarbonate resin thus obtained after the washing operation, was introduced into a jacketed, double armed, horizontal type mixer having a capacity of 15 liters, for concentration and pulverization.

Into the above mixer, 1 kg of a separately prepared halogen-containing polycarbonate powder was preliminarily fed, and hot water at a temperature of 80° C. was circulated through the jacket for heating. While stirring, the above-mentioned methylene chloride solution of the halogen-containing polycarbonate resin was introduced at a rate of 30 kg/hr. The pulverization was achieved while evaporating the methylene chloride.

The halogen-containing polycarbonate resin thus obtained has a bulk density of 0.75 g/ml, spherical particle sizes of 1 to 3 mm, a reduced viscosity of 0.48 $\eta sp/C$, a bromine content of 8.2% and a bisphenol A remainder of 15 ppm and exhibited a good processability when passed through an extruder.

With use of pellets of this resin, test samples were molded with an injection molding machine. Good test samples were obtained at a molding temperature of 310° C. under an injection pressure of 57 kg/cm².

EXAMPLE 2

In the presence of methylene chloride, BPA aqueous alkali solution and phosgene were reacted to obtain a methylene chloride solution containing 26.9% of oligomer (a) having a number average molecular weight of 720, terminal chloroformate groups 1818 μmol/g oligomer and terminal hydroxyl groups 1039 μmol/g oligomer.

Separately, in the presence of methylene chloride, BPA aqueous alkali solution, TBBPA aqueous alkali solution and phosgene were reacted to obtain a methylene chloride solution containing 26.7% of oligomer (b) having a number average molecular weight of 1080 a bromine content of 12.3%, terminal chloroformate groups 1189 μmol/g oligomer and terminal hydroxyl groups 680 μmol/g oligomer.

150 parts of the above-mentioned solution of oligomer (a), 220 parts of the solution of oligomer (b), 40 parts of 25% sodium hydroxide aqueous solution, 40 parts of water, 200 parts of methylene chloride, 1.5 parts of p-tertiary butyl phenol and 0.03 parts of triethylamine, were fed into an agitation tank, and the co-polymerization reaction was conducted for 1.5 hours under agitation.

After the completion of the co-polymerization reaction, the concentration of sodium hydroxide in aqueous solution was 0.78 N.

After the completion of the co-polymerization reaction, the reaction mixture was washed in the same manner as in Example 1. Upon completion of the first, third, and fifth washing steps, the water content of the methylene chloride solution was measured and found to be 0.77%, 0.25% and 0.22%, respectively.

The halogen-containing polycarbonate resin obtained by evaporating methylene chloride from the methylene chloride solution after the completion of the washing operation, had a reduced viscosity of 0.58 $\eta sp/C$, a bromine content of 7.5% and a bisphenol A remainder of 18 ppm.

EXAMPLE 3

In the presence of methylene chloride, BPA aqueous alkali solution and phosgene were reacted to obtain a methylene chloride solution containing 27.9% of oligomer (a) having a number average molecular weight of 1450, terminal chloroformate groups 1020 μmol/g oligomer, and terminal hydroxyl groups 350 μmol/g oligomer.

To 360 parts of this methylene chloride solution of oligomer (a), 50 parts of TBBPA aqueous alkali solution were added and reacted to obtain a methylene chloride solution containing 29.9% of oligomer (b) having a number average molecular weight of 2600, a bromine content of 13.0%, terminal chloroformate groups of 460 μmol/g oligomer, and terminal hydroxyl groups of 300 μmol/g oligomer.

110 parts of the solution of oligomer (a), 215 parts of the solution of the oligomer (b), 20 parts of 25% sodium hydroxide aqueous solution, 52 parts of water, 220 parts of methylene chloride, 1.8 parts of p-tertiary butyl phenol and 0.04 parts of triethylamine, were fed into an agitation tank and the co-polymerization reaction was carried out for 1.5 hours under agitation.

After the completion of the co-polymerization reaction, the concentration of sodium hydroxide in aqueous solution was 0.5 N.

After the completion of the co-polymerization reaction, the reaction mixture was washed in the same manner as in Example 1. Upon the completion of the first, third and fifth washing steps, the water content of the methylene chloride was determined to be 0.83%, 0.27% and 0.24%, respectively.

The halogen-containing polycarbonate resin obtained by evaporating methylene chloride from the methylene chloride solution, after the completion of the washing operation, had a reduced viscosity of 0.53 $\eta sp/C$, a bromine content of 8.1% and a bisphenol A remainder of 15 ppm.

EXAMPLE 4

In the presence of methylene chloride, BPA aqueous alkali solution, TBBPA aqueous alkali solution and phosgene, were reacted to obtain a methylene chloride solution containing 26.0% of oligomer (a) having a number average molecular weight of 830, a halogen content of 2.2%, terminal chloroformate groups 1520 $\mu$mol/g oligomer, and terminal hydroxyl groups 870 $\mu$mol/g oligomer.

Using a greater amount of TBBPA, the above method was repeated, whereby a methylene chloride solution containing 27.3% of oligomer (b) having a number average molecular weight of 4820, a halogen content of 16.8%, terminal chloroformate groups 270 $\mu$mol/g oligomer and terminal hydroxyl group 145 $\mu$mol/g oligomer was obtained.

190 parts of the solution of oligomer (a), 180 parts of the solution of oligomer (b), 22 parts of 25% sodium hydroxide aqueous solution, 52 parts of water, 200 parts of methylene chloride, 1.6 parts of p-tertiary butyl phenol and 0.04 parts of triethylamine, were fed into an agitation tank, and the co-polymerization reaction was conducted for 1.5 hours under agitation.

After the completion of the co-polymerization reaction, the concentration of sodium hydroxide in aqueous solution was 0.15 N.

After the completion of the co-polymerization reaction, the reaction mixture was washed in the same manner as in Example 1. Upon the completion of the first, third and fifth washing steps, the water content of the methylene chloride solution was determined to be 2.30%, 0.33%, and 0.28%, respectively.

The halogen-containing polycarbonate resin thus obtained by evaporating the methylene chloride after the completion of the washing, had a reduced viscosity of 0.59 $\eta$sp/C, a bromine content of 9.1% and bisphenol A remainder of 20 ppm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A halogen-containing polycarbonate resin formed by copolymerizing an admixture of monomers consisting essentially of the following oligomers (a) and (b) in the presence of caustic alkali, an organic solvent, water and in the substantial absence of residual bisphenol A and in the absence of added bisphenol A;
    (a) 10 to 85 parts by weight of a polycarbonate oligomer with terminal groups consisting of chloroformate groups or chloroformate groups plus hydroxyl groups less in a molar amount than the chloroformate groups, having a number average molecular weight of 500 to 10,000 and containing no aromatic halogen or less than 4% by weight of aromatic halogen, and
    (b) constituting the balance for a total of 100 parts by weight of oligomer, an aromatic halogen-containing polycarbonate oligomer with terminal groups consisting of chloroformate groups or chloroformate groups plus hydroxyl groups less in a molar amount than the chloroformate groups, having a number average molecular weight of 1,000 to 10,000 and containing 6 to 30% by weight or aromatic halogen.

2. The product of claim 1, wherein the polycarbonate resin contains 4 to 25% by weight of halogen.

3. A process for forming a halogen-containing polycarbonate resin comprising:
    (1) copolymerizing an admixture of monomers consisting essentially of the following oligomers (a) and (b) in the presence of caustic alkali, an organic solvent, water and in the substantial absence of residual bisphenol A and in the absence of added bisphenol A to form a solution of the halogen-containing polycarbonate in the organic solvent;
        (a) 10 to 85 parts by weight of a polycarbonate oligomer with terminal groups consisting of chloroformate groups or chloroformate groups plus hydroxyl groups less in a molar amount than the chloroformate groups, having a number average molecular weight of 500 to 10,000 and containing no aromatic halogen or less than 4% by weight of aromatic halogen, and
        (b) constituting the balance for a total of 100 parts by weight of oligomer, an aromatic halogen-containing polycarbonate oligomer with terminal groups consisting of chloroformate groups or chloroformate groups plus hydroxyl groups less in a molar amount than the chloroformate groups, having a number average molecular weight of 1,000 to 10,000 and containing 6 to 30% by weight of aromatic halogen
    (2) washing the organic solvent solution containing the halogen-containing polycarbonate resin with an aqueous washing agent; and
    (3) recovering the polycarbonate resin from the organic solvent.

4. The process of claim 3, wherein said organic solvent is methylene chloride.

5. The process of claim 4, wherein the viscosity of a methylene chloride solution containing 0.6 g/dl of the halogen-containing polycarbonate resin is 0.3 to 1.0 as measured at 20° C.

6. The process of claim 3, wherein the halogen-containing polycarbonate resin is recovered from the organic solvent by evaporating the organic solvent to concentrate the solution and thereby cause the halogen-containing polycarbonate resin to separate from solution.

7. The process of claim 6, wherein the halogen-containing resin is simultaneously comminuted as it separates from solution.

8. The product of claim 1, wherein oligomer (b) is formed by (1) reacting phosgene with a mixture of bisphenol A and a halogenated bisphenol A or (2) reacting phosgene with bisphenol A alone to form an oligomer reaction product and then reacting said oligomer reaction product with a halogenated bisphenol A.

9. The process of claim 3, wherein oligomer (b) is formed by (1) reacting phosgene with a mixture of bisphenol A and a halogenated bisphenol A or (2) reacting phosgene with bisphenol A alone to form oligomer reaction product and then reacting said oligomer reaction product with a halogenated bisphenol A.

10. The product of claim 1, wherein the molar amounts of the hydroxyl groups in the oligomer (a) and the oligomer (b) are 20 to 90% of the molar amounts of the chloroformate groups.

11. The process of claim 3, wherein the molar amounts of the hydroxyl groups in the oligomer (a) and the oligomer (b) are 20 to 90% of the molar amounts of the chloroformate groups.

12. The product of claim 1 or 8, wherein oligomer (b) is formed by reacting oligomer (a) with a halogenated bisphenol A.

13. The process of claim 3 or 9, wherein oligomer (b) is formed by reacting oligomer (a) with a halogenated bisphenol A.

* * * * *